Jan. 16, 1962  G. W. YARBER  3,017,145
CONTROL SYSTEM FOR VEHICLE WHEEL BRAKE
Filed Sept. 4, 1958  3 Sheets-Sheet 3

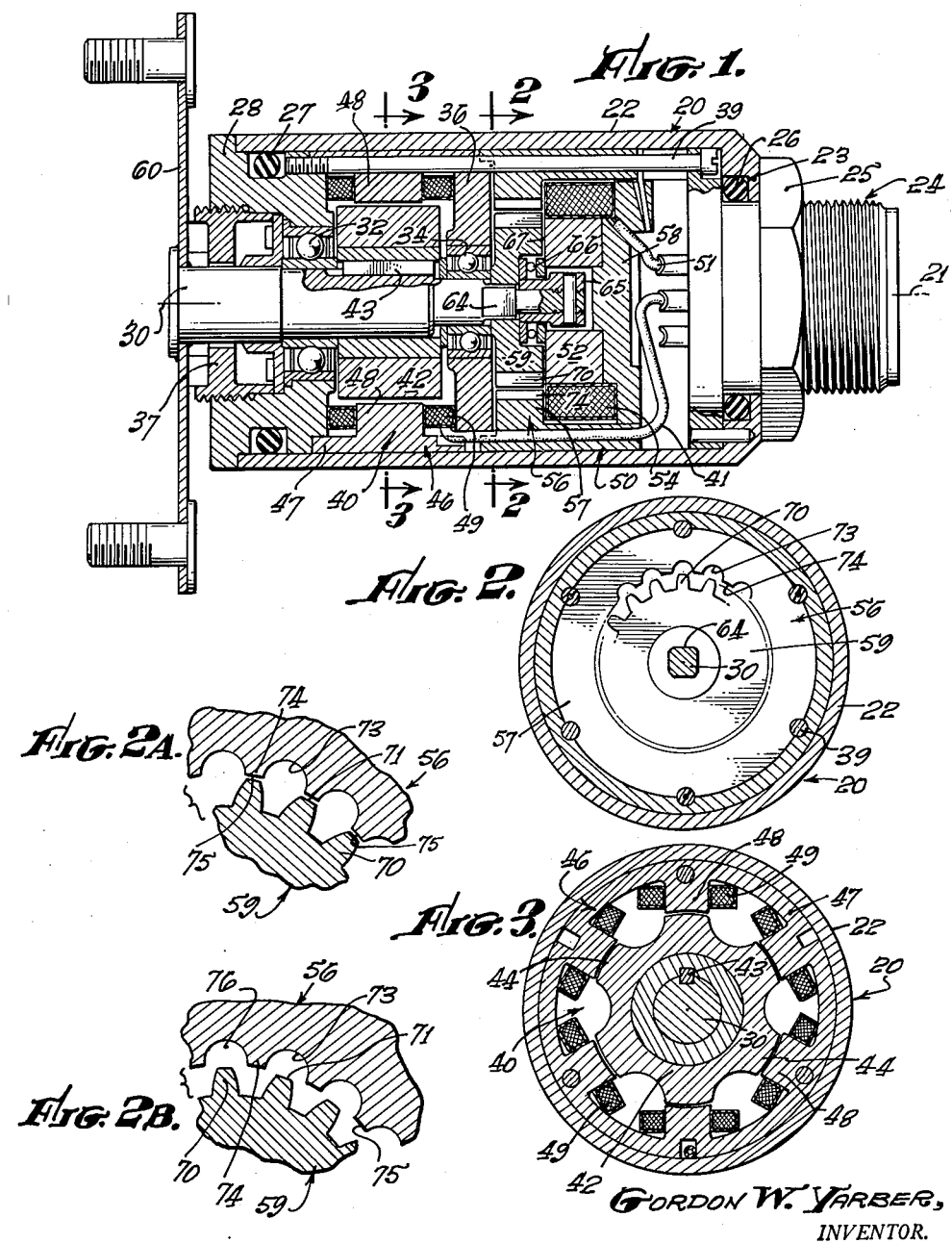

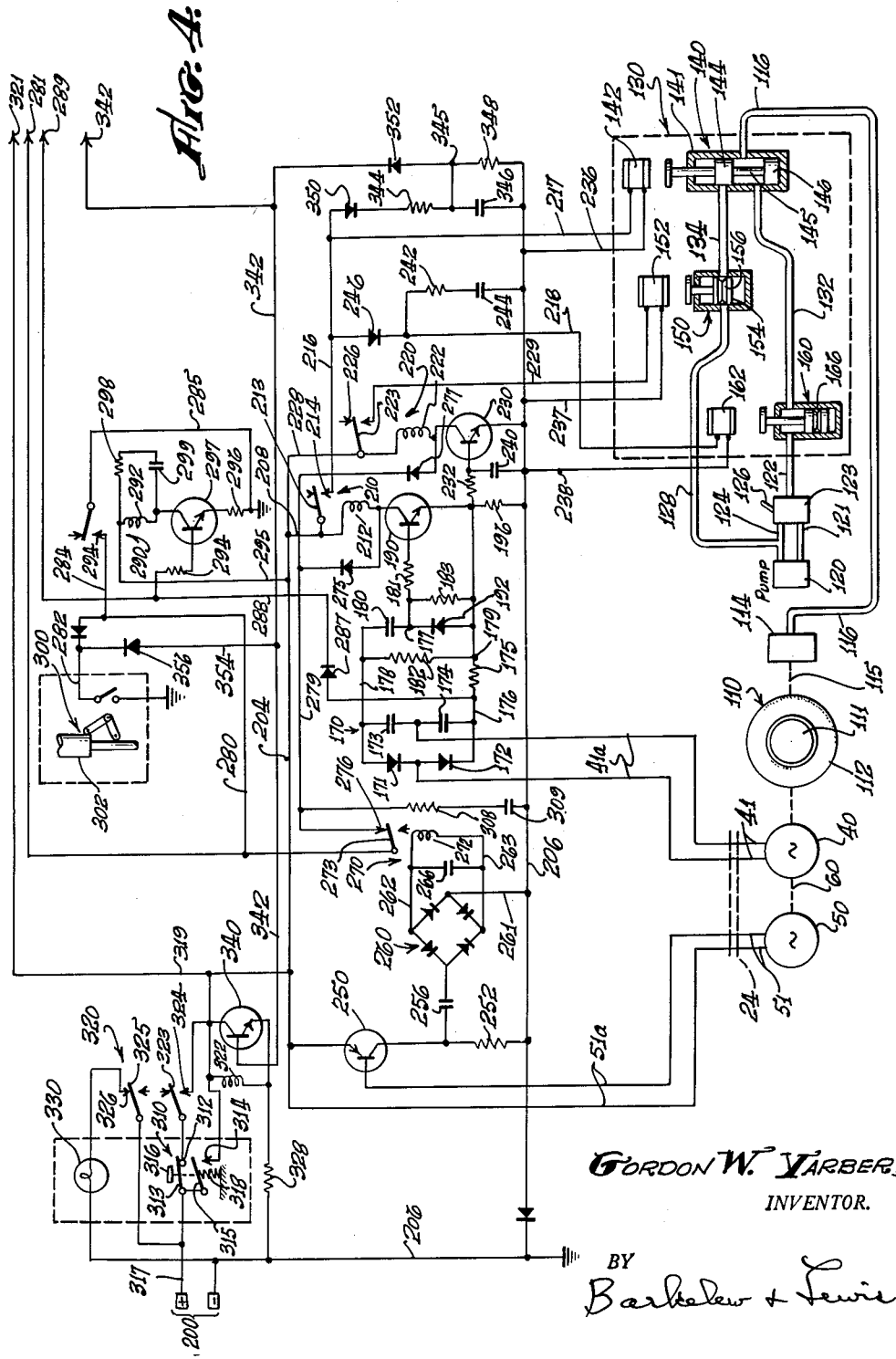

INVENTOR.
GORDON W. YARBER,
BY
Barkelew + Lewis

United States Patent Office 3,017,145
Patented Jan. 16, 1962

3,017,145
CONTROL SYSTEM FOR VEHICLE WHEEL BRAKE
Gordon W. Yarber, % General Delivery, Cornell, Calif.
Filed Sept. 4, 1958, Ser. No. 759,005
37 Claims. (Cl. 244—111)

This invention has to do with systems for the control of vehicle wheel brakes to prevent skidding of the braked wheel and to obtain more effective braking action.

Certain aspects of the invention relate more particularly to such control systems in which variations in the rate of rotation of the vehicle wheel are detected by electrical means. Electrical sensing systems are potentially more compact and of lighter weight than sensing systems of other types. Electrical sensing systems offer the further advantage that the detailed nature of their response can be adjusted particularly conveniently and economically.

Electrical systems in accordance with the present invention provide the further advantage of being substantially free of spurious signals, which are extremely difficult to avoid in mechanical devices of comparable sensitivity. That advantage is particularly marked in systems which are intended for controlling the landing wheels of aircraft, which may be subject to large linear accelerations, and in which both space and weight are at a premium.

The invention further provides particularly desirable amplifying systems whereby reliable control action can be obtained from initial signals of relatively low power. The circuits of the invention further provide particularly effective control action, which may be relatively complex in its detailed operation, without requiring any corresponding complexity of the mechanism for directly sensing the wheel acceleration.

More particularly, the present invention provides a brake control system which may operate in a series of steps, corresponding to increasing degrees of wheel deceleration, all under the control of a single electrical wheel deceleration signal.

A further important aspect of the invention provides mechanism by which the braking pressure, after it has been reduced to check an incipient skid, may be increased initially at a relatively low rate, and returned to full value only after substantially normal equilibrium condition of the wheel has been re-established. Such gradual reapplication of the brakes has the great advantage of avoiding drastic over-shoot of braking torque when, for any reason, excessive braking pressure is being metered to the brakes. Such gradual reapplication of the brakes is particularly beneficial when provided in combination with step-wise release of the braking pressure in response to an incipient skid. That effective combination of control actions can be provided in a control system in which the rate of change of wheel rotation is sensed electrically; and can also be accomplished in systems which utilize other types of sensing unit such, for example, as inertial sensing systems.

A particularly serious problem in the control of aircraft brakes is posed by the fact that the landing gear of an aircraft cannot be completely rigid. In actual practice, the maximum force developed by the brakes typically deflects the landing gear enough to move the wheel several inches aft of its normal position with respect to the air frame. If the brake is then abruptly released, the resilience of the landing gear moves the wheel rapidly back toward its normal position; and inertia of the landing gear and wheel causes forward deflection. Since the available damping forces are typically relatively small, a resonant vibration of the landing gear is readily set up, causing the wheel to move alternately forward and aft with respect to the airframe at a definite natural frequency characteristic of the structure. That natural frequency is typically from about 5 to about 15 cycles per second. The resulting translational oscillation of the wheel causes a corresponding rotational oscillation, which is superimposed upon the normal rolling speed of the wheel. The wheel rotation is thus subject to alternating acceleration and deceleration.

Many existing brake control systems tend to release the wheel brake in response to the deceleration phase of such wheel oscillation, reacting to that wheel deceleration as if it were due to an incipient skid. Then, in response to the following acceleration phase of the wheel oscillation, the control system tends to reapply the brake. If the response time of the brake control system is comparable to the natural period of oscillation of the landing gear, which is difficult to avoid without sacrifice of effective skid control, the resonant vibration of the landing gear tends to increase progressively with each oscillation, frequently leading to structural failure of the landing gear.

An important object of the present invention is to prevent such interaction between the brake control system and the natural oscillation of the landing gear, while maintaining full effectiveness and sensitivity of the anti-skid action. That is accomplished by providing in the brake control system suitable timing action of several distinct types. By establishing suitable relations, to be described, between the time constants of the brake control system and the known characteristics of the aircraft landing gear, I have found that it is possible to provide sensitive and effective skid control while preventing undesirable landing gear oscillation.

A further aspect of the present invention has to do with particularly effective electrical generating means for providing a signal which is responsive to relatively slow rates of wheel rotation. Such a signal is valuable for providing brake control when one or more of the wheels becomes momentarily locked. A generator unit of the present novel type provides an effective electrical signal at remarkable low rates of wheel rotation; and has the further advantage that the signal amplitude does not increase excessively as the wheel approaches normal operating speed.

A full understanding of the invention, and of its further objects and advantages, will be had from the following description of certain illustrative embodiments. However, the particulars of that description, and of the accompanying drawings which form a part of it, are not intended as a limitation upon the scope of the invention, but are only for illustration.

In the drawings:

FIG. 1 is an axial section of an illustrative sensing system which embodies distinct electrical generators adapted for sensing wheel rotation and wheel acceleration, respectively;

FIG. 2 is a transverse section on line 2—2 of FIG. 1;

FIG. 2A is a fragmentary section corresponding to a portion of FIG. 2 at enlarged scale and with pole faces aligned;

FIG. 2B is a fragmentary section corresponding to FIG. 2A but showing the pole faces staggered;

FIG. 3 is a transverse section on line 3—3 of FIG. 1;

FIG. 4 is a schematic drawing representing an illustrative control system utilizing the sensing mechanism of FIGS. 1 to 3;

Figure 5:
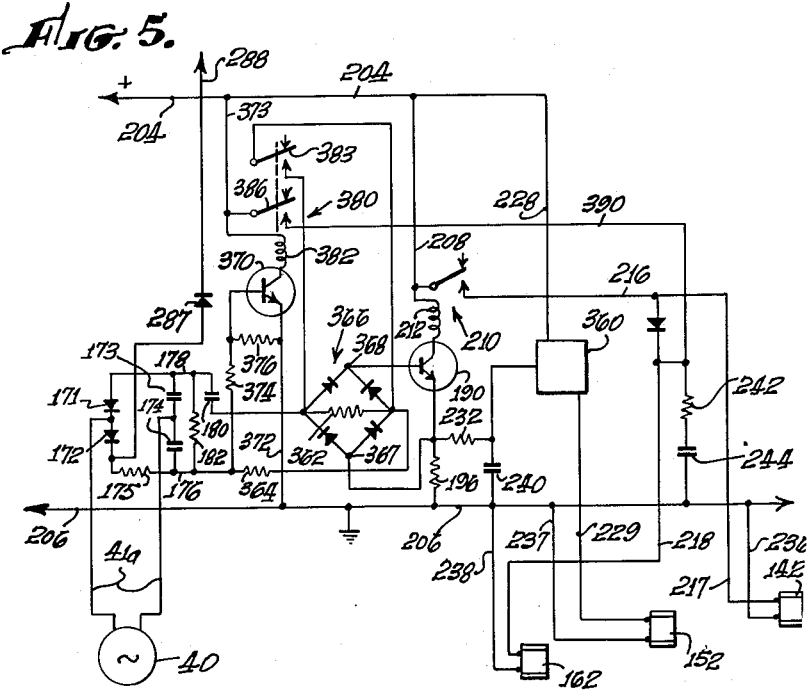
FIG. 5 is a fragmentary schematic drawing corresponding to a portion of FIG. 4 and representing a modification.

Illustrative sensing mechanism for the wheel rotation and for the rate of change of the wheel rotation is shown illustratively in FIGS. 1 to 3. The mechanism is enclosed in a cylindrical case 20, with axis 21 and comprising a sleeve member 22 having a radially inner flange 23 at what will be referred to for convenience as its inner end. That end of sleeve 22 is closed by the electrical connector 24, which is typically of conventional construction. The outer end of sleeve 22 is closed by the end piece 28, which is axially bored to receive a drive shaft 30. Shaft 30 is journaled by an outer bearing 32 on end piece 28 and by an inner bearing 34 on the annular frame member 36. Outer bearing 32 is protected from foreign matter by sealing means indicated generally at 37. The acceleration sensing generator 40 is mounted between annular member 36 and end piece 28. Rotation sensing generator 50 is located inwardly of member 36. The entire assembly comprising members 28 and 36, connector 24, and the two generator units 40 and 50, is secured together by the axial screws 39 to form a unitary structure. That structure is insertable bodily into the outer end of sleeve 22, and is retained by connector nut 25. Suitable sealing means are shown as the O-ring 26 at the inner end of sleeve 22, and the O-ring 27 at its outer end.

The outer end of shaft 30, just outward of housing 20, carries a fitting, shown illustratively as the radial bar 60, by which it may be conveniently driven by any suitable coupling mechanism in accordance with the rotation of the braked wheel. In typical installation of the sensing unit on an aircraft landing wheel, housing 20 is mounted on the structure on which the wheel itself is journaled, coaxially with and just outboard of the wheel itself.

Generator 40 typically comprises an alternator having its rotor 42 fixedly mounted on shaft 30 as by the spline 43. The stator of the alternator is indicated generally at 46 and comprises a core member 47 with a plurality of poles 48. Electrical windings 49 are mounted on the respective poles, typically in the manner shown in FIG. 3. Rotor 42 is formed with corresponding poles 44 and is permanently magnetized in conventional manner. Windings 49 are connected to suitable terminals in connector 24, as by flexible leads indicated at 41. Alternator 40 produces at those terminals an alternating current which varies in frequency and amplitude substantially in direct proportion to the speed of rotation of shaft 30.

Rotation sensing generator 50 comprises a permanent magnet 52 of generally annular form, magnetized parallel to axis 21, a winding 54, also coaxial with axis 21, and core structure indicated generally at 56. Core structure 56 forms with magnet 52 a magnetic circuit threading winding 54. Core structure 56 comprises a stator formed typically of two elements 57 and 58; and a rotor 59 which is fixedly mounted on the square portion 64 of shaft 30 and retained by the nut 65. A thrust bearing 66 for shaft 30 is provided in the immediate vicinity of alternator 50 to provide accurate definition of the axial position of the shaft. In accordance with the present invention that thrust bearing is preferably inserted directly between magnet member 52 and rotor 59 as shown in FIG. 1. It is then possible to design those parts so that the air gap 67 between the magnet and rotor has a minimum and yet strictly uniform width. That has the advantage of increasing the efficiency of the core structure while insuring reliability of operation, even under a wide range of temperatures.

The axially outer portion of stator member 57 lies in the same radial plane with rotor 59, and those two members are provided with cooperating pole formations shown best in FIGS. 2, 2A and 2B. The pole formations 70 of rotor 59 are closely similar to the teeth of a spur gear. The ends of teeth 70 are ground off to form pole faces 71 which lie accurately in a common cylindrical surface about axis 21. The spacing between adjacent pole faces 71 exceeds the circumferential width of those faces by an appreciable factor, equal to at least 1.5. The opposing surface of stator member 56 is scalloped, as at 73, to produce pole formations 74 equal in number to the teeth 70 of the rotor. Pole formations 74 terminate in pole faces 75 which lie in a common cylindrical surface concentric with, and of only slightly greater diameter than, that of rotor pole faces 71. The circumferential widths of pole faces 71 and 75 are preferably equal. When the opposing pole faces are mutually aligned, as indicated in FIG. 2A, the magnetic circuit of the core structure is interrupted substantially only by the very slight air gap between those opposing faces. On the other hand, when the opposing poles are staggered, as shown in FIG. 2B, rotor 59 is separated from stator member 56 by an air gap of appreciable width.

The resulting variations in the effective width of air gap 76 as rotor 59 revolves produces a periodic variation in the magnetic flux that threads winding 54. An alternating current voltage is therefore produced in that winding, the frequency of which is equal to the rate of revolution of shaft 30 multiplied by the number of rotor teeth 70. I have found that greatly improved operation of a rotation sensing generator may be obtained with the described structure when the number of teeth 70 is made equal to at least about 16. The frequency of the resulting alternating current signal for any given speed of shaft rotation is thereby increased by a factor of from about 2 to about 4 as compared with alternators of conventional construction. That increase in frequency is attained with the present type of construction without appreciable loss of signal amplitude, for structures of comparable mass and size. The higher frequency of output signal permits the rotation of the braked wheel to be detected effectively more rapidly and at lower wheel speed.

A further advantage of the present structure of rotation sensing alternator 50 is the fact that both the voltage and current output of the alternator reach substantial saturation at relatively low wheel speed. That characteristic has the advantage that it is unnecessary to take special precautions to avoid overloading of the associated circuitry.

The brake control system shown schematically in FIG. 4 is illustrative of the wide variety of systems in which sensing means such as generators 40 and 50 may be utilized. The illustrative system of FIG. 4 embodies additional aspects of the present invention. As there represented, a vehicle wheel is indicated schematically at 110 with a wheel hub 111 and a balloon type pneumatic tire 112. Such a wheel may typically comprise part of the landing gear of an aircraft. Generators 40 and 50, which are typically of the type already described, are indicated schematically, driven in accordance with the wheel rotation by coupling means represented at 60. A brake for wheel 110 is indicated schematically at 114 with a conduit 116 through which fluid under pressure is supplied to the brake by means to be described. Brake 114 exerts a braking force on wheel 110 via a mechanical connection represented at 115. That braking force corresponds in known manner to the fluid pressure supplied via conduit 116.

An illustrative source of fluid pressure is indicated as the pump 120, which supplies fluid under a suitable pressure to the pressure conduit 121. That pressurized fluid is normally metered to the brake by the regular control valve 123 via conduit 122, excess fluid being returned to pump 120 via the return line 124. Metering valve 123 is typically controlled manually, as by the control lever 126. In the system of the present invention, pressurized fluid from line 122 is supplied to brake line 116 and thence to brake 114 via the valve means indicated schematically and in illustrative form at 130. Valve 130 is automatically controlled in accordance with rotation of the braked wheel by means of suitable control signals derived from generators 40 and 50 in a manner to be illustratively described. A low pressure return line from valve means 130 to return line 124 is indicated at 128.

Valve system 130, as illustratively and schematically shown in FIG. 4, comprises three distinct solenoid-operated valve units. The main actuating unit, indicated schematicaly at 140, is a three-way valve operated by a solenoid 142. Valve 140 comprises a cylindrical valve housing 141 and an axially movable valve member which comprises the valve pistons 144 and 146, joined at a fixed spacing by the rod 145. In idle condition of solenoid 142, valve 140 connects brake line 116 to the supply line 132, as illustrated, the relief line 134 being cut off by valve piston 144. Energization of solenoid 142 shifts valve pistons 144 and 146 upward, opening the valve port to relief line 134 and shutting off supply line 132 by piston 146. Hence, in energized condition of the valve, brake line 116 is connected only to relief line 134.

Relief line 134 is connected to return line 128 by the control valve indicated schematically at 150. Valve 150 is controlled by the solenoid 152. In idle condition of the solenoid the valve member 154 cuts off communication between lines 134 and 128, except via the restricted passage 156 in the valve member. Passage 156 is shown schematically as a small circumferential groove in the valve piston, its size being exaggerated for clarity of illustration. Thus when the valve is idle, a predetermined limited amount of flow is permitted between lines 134 and 128. Actuation of solenoid 152 shifts the valve member upward from a condition of restricted flow to open position, permitting substantially free flow.

Supply line 132 is connected to pressure line 122 via the control valve 160, which is typically similar in construction and operation to control valve 150, except that its idle and actuated conditions are interchanged. In idle condition of the solenoid 162, valve 160 permits substantially free flow between line 122 and line 132. Solenoid energization actuates the valve, shutting off all communication between the connected lines save for the restricted flow permitted through a leakage passage of predetermined size indicated at 166.

In the preferred manner of operating the valve system 130, that system is capable of four distinct conditions. In normal condition of the brake control system, all three valve solenoids are idle, as represented in FIG. 4. Brake 114 is then directly connected to metering valve 123 and the brake is therefore directly controllable by handle 126 ing the normal manner. In brake releasing condition of the valve system, valve 140 and valve 150 are both actuated by energization of solenoids 142 and 152, connecting brake line 116 to relief line 134. Any fluid pressure at the brake is thereby positively released to return line 128, releasing the brake.

The valve system is also capable of two intermediate or control positions. In one of those positions which will be referred to as brake relieving position, main valve 140 is actuated by energization of solenoids 142, connecting brake line 116 to relief line 134; while valve 150 remains idle, permitting flow from line 134 to return line 128 only via the restricted passage 156. Braking pressure is thereby permitted to decrease at a limited rate which is controllable by suitable selection of the effective dimensions of passage 156. In the other intermediate position of the brake system, which will be referred to as the recovery position, main valve 140 is in idle position as illustrated and valve 160 is actuated to closed position by energization of solenoid 162. The brake is thereby connected to metering valve 123 only via the restricted passage 166. Hence any fluid pressure metered at lever 126 is supplied to the brake only at a limited predetermined rate which is controllable by selection of the effective size of passage 166.

In normal condition of the valve system, and also in the described intermediate recovery condition, the position of control valve 150 is immaterial since relief line 134 is cut off in any case at main valve 140. In fully actuated condition and in the described intermediate brake relieving condition of the valve system the position of control valve 160 is immaterial, since supply line 132 is cut off by actuation of main valve 140.

It will be understood that the schematic valve system indicated at 130 is intended only for illustration, and that in actual practice it might be convenient to employ quite different valve structure which would, however, produce valving functions basically equivalent to those described. For example, the functions of the three valve units 140, 150 and 160 can, if desired, be performed by a single valve unit with suitable control mechanism. Such mechanism is described and claimed in my copending patent application, Serial No. 758,990, filed on September 4, 1958, and entitled "Multiple-Position Valve," now Patent 2,910,089. In FIGS. 9 and 10 of that application, for example, solenoid windings 83, 128 and 195 control functions that correspond generally to the described functions of solenoid windings 142, 152 and 162 of the present illustrative valve system, energized condition of winding 128 corresponding to idle condition of winding 152.

The valve system shown typically at 130 operates in response to signals derived from alternators 40 and 50. The electrical control circuit of FIG. 4 is supplied with direct current power from a suitable source, indicated schematically at 200. That power is supplied directly to the grounded negative bus 206, and via the control switch 310 and safety relay, to be described, to the positive bus 204. The output signal from generator 40 on lines 41 is transmitted through connector 24 to lines 41a and thence is supplied to the voltage doubling rectifying network indicated schematically at 170. That network comprises typically two rectifiers 171 and 172, shown illustratively as semi-conductor diodes, and two capacitors 173 and 174 connected to form a rectifying bridge. Capacitors 173 and 174, in addition to their known function of markedly increasing the direct current voltage derived from an alternating current signal of given voltage amplitude, provide valuable timing control of the system response, as will appear.

The output from rectifier 170 comprises a direct current signal which is supplied to lines 176 and 178. As shown, line 176 is positive with respect to line 178. The voltage difference between those two lines produced by rectifier 170 is substantially proportional to the rate of rotation of wheel 112 throughout the range of wheel speeds encountered during landing.

The direct current signal on lines 176 and 178 is applied across a voltage divider which comprises the resistors 175 and 182, of which the junction 179 is connected to ground via the resistance 196. Resistance 182 is shunted by the capacitor 180 and the unidirectional device 192, connected in series. Device 192, shown as a junction diode, is connected in such polarity as to conduct positive current from junction 179 toward capacitor 180. A path for current flow in the opposite direction is provided via the input circuit of a semi-conductor amplifying device 190. Device 190 is preferably a silicon npn junction transistor having its emitter connected to junction 179 and its base connected via the current limiting resistance 181 to the junction 177 between diode 192 and capacitance 180. A resistance 183 may be connected between junctions 177 and 179 in parallel with diode 192 and with the base-emitter circuit of the transistor. The collector of transistor 190 is connected to positive bus 204 via line 208 and the winding 212 of the relay 210. The collector-emitter circuit is completed via resistance 196, already mentioned, to negative bus 206.

When wheel 110 rotates at uniform speed, for example, a direct current voltage of corresponding magnitude is supplied by rectifier 170 to capacitor 180 via diode 192, charging the capacitor to that definite voltage. Due to the low resistance of diode 192 in the forward direction, the base and emitter of transistor 190 are held at substantially equal potential during such uniform rotation of wheel 110 and also during positive acceleration of the wheel, cutting off current in the output circuit of the transistor and idling relay 210. On the other hand, during wheel deceleration, the direct current signal supplied by rectifier 170 to lines 176 and 178 decreases. That decrease corresponds generally to the rate of wheel deceleration, but lags behind the latter, particularly during abrupt and rapid deceleration, due to the time required for capacitors 173 and 174 to discharge through resistors 175 and 182 in series. The RC constant for that discharge is variable within wide limits by suitable selection of the component values. For convenience of reference, resistor 182 will be referred to as the load resistor; and the RC constant for the discharge circuit just described will be referred to as the load time constant.

The described decrease of direct current voltage on lines 176 and 178 causes capacitor 180 to discharge at a rate which increases with the rate of wheel deceleration. Due to the blocking action of diode 192, that discharge takes place via resistor 183 and the parallel path through resistor 181 and the base and emitter of transistor 190. For convenience of reference, capacitor 180 will be referred to as the rate capacitor; and the RC constant for its discharge will be referred to as the rate time constant. The effective value of the latter may be determined within wide limits by suitable selection of the component values.

The discharge current from rate capacitor 180 renders the base of transistor 190 positive with respect to the emitter. As that voltage difference increases, the base-emitter resistance decreases slowly at first and then more rapidly from its cut off value, typically one or two thousand ohms, to a relatively low value, increasing the fraction of the current that enters the transistor base. That current constitutes an input signal to transistor 190, causing corresponding current to flow in the collector-emitter circuit of the transistor. When current flow in the collector-emitter circuit of transistor 190 attains a predetermined critical value it causes actuation of relay 210. Such current also produces a proportional voltage drop in resistor 196.

The switch armature 213 of relay 210 is connected via line 208 to positive bus 204. The normally open contact 214 of the relay switch is connected to the line 216 and thence via the line 217 to one terminal of solenoid 142 and also via the line 218 to one terminal of solenoid 162. The opposite terminals of solenoids 142 and 162 are connected to negative bus 206 via the respective lines 236 and 238. Hence, actuation of relay 210 causes energization of both of those solenoids.

A second relay 220 has its winding 222 controlled by a second semi-conductor amplifying device, shown as the npn junction transistor 230. The emitter of transistor 230 is connected directly to negative bus 206, and its collector is connected via relay winding 222 and line 228 to positive bus 204. A control signal is supplied to transistor 230 by connection of its base via the resistance 232 to the positive side of resistance 196 in the output circuit of transistor 190. A capacitor 240 is connected between the base and emitter of transistor 230. The switch armature 223 of relay 220 is connected to line 228, and the normally open switch contact 226 is connected via the line 229 to one terminal of solenoid 152. The other solenoid terminal is connected to negative bus 206 via the line 237. Hence solenoid 152 is energized in response to actuation of relay 220.

Means of any suitable type are provided for delaying the release of solenoid 162 in response to deactuation of relay 210. As shown, such means comprise the resistance 242 and the capacitance 244 series connected in shunt to the solenoid winding. A uni-directional device, shown as the junction diode 246, is inserted between line 216 and that delay circuit. When solenoid 162 is energized by actuation of relay 210, capacitance 244 becomes charged. Upon release of the relay, capacitance 244 discharges through the solenoid due to the blocking action of diode 246, maintaining energization of the solenoid for a predetermined time interval which can be adjusted by suitable selection of the values of the capacitance and of resistance 242.

Under normal operating conditions of wheel 110, for example when the wheel is accelerating or rotating at uniform speed, substantially zero input signal is supplied to the base of transistor 190. The collector-emitter circuit of the transistor is thereby cut off, idling relay 210 and producing substantially zero voltage drop across resistor 196. As a result, the input signal to the base of transistor 230 is also substantially zero, cutting off the collector-emitter circuit of that transistor and idling relay 220. The circuits for main valve solenoid 142 and control valve solenoid 162 are therefore open at the switch of relay 210; while the circuit for control valve solenoid 152 is open at contact 226 of relay 220. Hence in normal condition of the system, brake 114 is responsive in normal manner to manual control at lever 126.

If, now, the brake is applied in a normal manner, wheel 110 is caused to decelerate gradually at a moderate rate which corresponds to the rate of deceleration of the entire vehicle. Under that condition the direct current voltage supplied to lines 176 and 178 by rectifier 170 decreases in magnitude at a correspondingly moderate rate. Capacitor 180 and other circuit components are so selected that the rate of condenser discharge corresponding to such normal braking of wheel 110 produces less than threshold voltage between the base and emitter of transistor 190. Hence such wheel deceleration produces substantially zero conduction in the collector-emitter circuit of the transistor. The remaidner of the control system therefore remains in its normal condition, already described.

On the other hand, if wheel 110 should start to lose speed at a faster rate than corresponds to maximum normal vehicle deceleration, which condition typically corresponds to an incipient or actual skid of the wheel, the rate of discharge of capacitor 180 increases correspondingly. The resulting increased base current in transistor 190 causes conduction in the collector-emitter circuit, the current in that circuit increasing substantially in proportion to the input base signal. Relay 210 is preferably so selected that the collector current resulting from only slightly excessive wheel deceleration will cause relay actuation. Immediately upon actuation of relay 210, main valve 140 and control valve 160 are both actuated. The resulting valve condition cuts off pressure supply to the brake at main valve piston 146 and permits the existing brake pressure to decrease slowly via restricted passage 156 of idle control valve 150. So long as that valve condition exists, the brake pressure gradually decreases at a rate corresponding to the selected dimensions of aperture 156. That decrease in braking force is sufficient to check many incipient skids before the rate of wheel deceleration has become much higher than normal. A particular advantage of the present invention is that the described highly sensitive action of the control system can be effectively utilized, greatly increasing the braking efficiency of the wheel.

As an incipient skid is thus checked, the wheel ceases to decelerate and is then typically accelerated back toward normal speed at a relatively rapid rate. Such acceleration causes a corresponding increase in the direct current voltage from rectifier 170. The discharge of capacitor 180 is thereby checked and a charging current flows to the capacitor from line 176 via diode 192. As a result, transistor 190 is again cut off and relay 210 is idled. The circuit through main valve solenoid 142 is immediately opened at relay switch contact 214, restoring that valve to the normal position shown in FIG. 4. However, control valve 160 remains actuated by discharge of capacitor 244, as already described, for a predetermined time interval. That delayed release of valve 160 prevents the braking pressure from being immediately raised back to the previous value. However, the braking pressure is permitted to increase gradually at a limited rate corresponding to the selected dimensions of passage 166 of valve 160. The resulting gradual reapplication of the braking pressure, particularly after an incipient skid has been checked at an early stage, permits the brake to return smoothly to normal operation, avoiding an overshoot of brake pressure which might lead immediately to a repetition of the skid cycle. After the predetermined time delay for release of control valve 160, solenoid 162 becomes deenergized, and valve 160 again opens. The brake is thereby fully restored to normal control from metering valve 123.

If an incipient skid is too severe to be checked in the manner just described by operation of relay 210 and the resulting gradual reduction of braking pressure, the wheel deceleration typically continues and its rate tends to increase. The rate of discharge of capacitor 180 increases correspondingly, producing a substantially proportionate increase in the current in the output circuit of transistor 190. When that current reaches a second predetermined condition the control signal supplied from resistor 196 to the base of transistor 230 becomes sufficient to produce in the output circuit of the transistor a current which actuates relay 220. Control valve 150 is thereby shifted to fully open condition, completing a path through actuated main valve 140 and line 134 for rapid release of brake 114.

In the present embodiment, that control action, leading to complete release of the brake, is further conditioned by circuit means shown illustratively as the capacitor 240. That capacitor acts in conjunction with resistor 232 to limit the rate at which rapid changes in the voltage drop across resistance 196 are supplied to the base of transistor 230. In equilibrium condition of the circuit, the voltage drop across resistor 196, which varies directly with the rate of wheel deceleration as has been pointed out, is supplied as input signal to transistor 230. That is effectively true also when the signal voltage as resistor 196 changes relatively slowly compared to the RC time constant of resistor 232 and capacitor 240. However, capacitor 240 and resistor 232 act to delay the adjustment of the transistor input signal to any abrupt change in the voltage at resistor 196. During typical operation in response to an abrupt decrease in wheel speed, the signal supplied to transistor 230 varies substantially as the time integral of the voltage standing across resistor 196. In effect, relay 220 is actuated in response to a predetermined critical value of that time integral. If the rate of wheel deceleration is high, that critical value of its time integral is reached relatively quickly; whereas a considerably lower value of wheel deceleration may yet cause actuation of relay 220 provided it continues for sufficient length of time. With that arrangement, following actuation of relay 210, relay 220 is actuated only after a time delay which varies inversely with the existing rate of wheel deceleration.

As an example, the circuit components may be arranged so that if the rate of wheel deceleration continues at a value which just exceeds a predetermined threshold, typically from two to three times the value required to actuate first stage relay 210, second stage relay 220 will be actuated after a delay of approximately 0.2 second. That illustrative action may occur, for example, in response to a relatively mild incipient skid which, nevertheless, is not promptly controlled by the described brake relieving intermediate action of the system. In the case of a more severe incipient skid, such as typically occurs if the wheel encounters a slippery spot on the runway, the rate of wheel deceleration typically increases rapidly beyond that threshold value. Under that condition relay 220 is actuated after a much shorter time delay, since the described critical value of the time integral of the voltage on resistor 196 is then reached more rapidly. It will be understood that the described characteristics of the system may be varied by suitable adjustment of capacitor 240, resistor 232 and other components of the system; and such components may be provided in adjustable form, if desired, to facilitate adjustment of the system to various conditions of operation.

The described complete release of brake 114 in response to actuation of relay 220 is maintained only long enough for wheel 110 to cease deceleration and start to accelerate back toward normal speed. Even before such normal speed is attained, and while the rate of wheel acceleration is still typically high, the increasing direct current output from rectifier 170 cuts off transistor 190. The resulting decrease substantially to zero of the output current from that transistor releases relay 210. Main valve 140 is thereby released and returns to its normal position as illustrated. As soon as capacitor 240 has substantially discharged via resistors 232 and 196 and the base-emitter of transistor 230, the latter is cut off, releasing relay 220. Control valve 150 is thereby returned to its normal flow-limiting position, but has no immediate effect in view of the position of main valve 140. Control valve 160 remains actuated via the time delay circuit already described, limiting the rate at which pressure can be re-supplied to the brake. Valve passage 166 is typically selected so that the resulting limited rate of flow will restore the brake to effective operation within the delay time that valve 160 remains actuated.

By way of summary, it will be seen that in the brake control system of the present embodiment of the invention occurrence of an incipient skid causes the system to move toward a condition of brake release; but valve system 130 moves initially only to an intermediate condition in which the brake pressure is relieved at a limited and typically very moderate rate. If that valve condition fails to arrest the skid within a time that varies with the severity of the skid, the valve system is abruptly shifted to brake releasing condition. Upon termination of an incipient or actual skid, the valve system tends to return to normal; but again is temporarily checked at an intermediate condition in which brake pressure is restored only at a limited and typically quite slow rate. That limited rate of pressure supply facilitates reestablishment of equilibrium throughout the system and prevents spurious action of the control system.

I select the component values of the differentiating circuit comprising capacitor 180 to give the smallest RC constant that will insure that, in response to an incipient skid, an effective skid signal is maintained by discharge of the capacitor until the wheel rotation has substantially stopped. Thereafter a brake release signal is then developed by the locked wheel control to be described. Continuity of those signals may be insured under typical conditions by making the RC constant of the differentiating circuit equal to approximately 0.3 to 1 second. The value of resistor 183 is preferably selected to permit capacitor 180 to discharge its voltage without causing skid control action during normal wheel deceleration.

In accordance with one aspect of the invention, the described control action is made effectively non-responsive to changes of wheel speed that are due to fore and aft deflection of the aircraft landing gear, while maintaining high sensitivity and effective response of the system to wheel deceleration caused by incipient or actual skidding of the wheel. The full accomplishment of that critical objective involves several distinct features, each of which is independently useful, but which cooperate in a novel manner to provide optimum performance.

When resonant oscillation of the landing gear occurs for any reason, the rate of wheel rotation oscillates correspondingly, passing through a maximum as the landing gear moves forward and passing through a minimum as the landing gear moves rearward relative to the aircraft. The wheel therefore alternately accelerates and decelerates at the oscillation frequency of the landing gear. Such angular wheel oscillation may involve intermittent decelerations as high as 500 to 1000 radians per second per second, for example. That intermittent wheel movement is typically superimposed on the relatively slow wheel deceleration, typically from 10 to 20 radians per second per second, that corresponds to normal deceleration of the entire aircraft. Conventional anti-skid brake control systems tend to release the brakes in response to the intermittent peaks of wheel deceleration. Moreover, that brake release may become effective as the landing gear approaches its maximum rearward deflection. The rearward loading of the landing gear is thereby removed, tending to increase the amplitude of the following forward deflection. And since that forward deflection causes wheel acceleration, the brake control system typically causes reapplication of the brake, which tends to become effective as the landing gear approaches maximum forward deflection. The amplitude of landing gear oscillation may thus be increased very rapidly beyond the strength limits of the structure. Even when that does not occur, braking effectiveness is seriously reduced.

In the present control system that type of resonant interaction between the anti-skid action and the landing gear oscillation is prevented by providing time delay circuit means which extend the response time of the system in a particular manner. The rate of decrease of the voltage across load resistor 182 is limited by providing capacitance of selected value which is effectively connected in shunt to that resistance. As illustrated in FIG. 4, that capacitance comprises the two capacitors 173 and 174 of voltage-multiplying rectifying circuit 170. In addition to their function in the voltage doubling circuit, capacitors 173 and 174 form with resistors 175 and 182 a voltage stabilizing circuit which limits the rate at which the voltage between lines 176 and 178 can decay. The voltage delivered by the differentiating circuit that includes capacitor 180 and the action of any brake relieving mechanism controlled by that voltage are correspondingly delayed. If such delay is excessive it may impair control of actual skids. But I have found that it is possible, by providing an amount of delay within definite limits, to maintain effective skid control action and yet prevent any response, under many operating conditions, to the deceleration phase of the landing gear oscillation. That may be accomplished by providing a delay circuit having an RC constant between about one half and about five times the natural period of oscillation of the landing gear; and preferably equal to two or three times that period. As an example, if the natural period of the landing gear has the illustrative value of 0.1 second, the product RC for the described delay circuit should be at least 0.05 and preferably 0.2 or 0.3.

By suitable selection of the circuit capacitance and of resistor 175, the desired RC value can be obtained in practice for a wide range of values of load resistance 182. Hence the value of the latter within that range may be selected to satisfy other circuit conditions. The capacitance provided by the voltage doubler circuit may be supplemented, if necessary, by additional capacitance connected in shunt to load resistance 182; or such additional capacitance may replace elements 173 and 174 if a full wave rectifier is preferred to the voltage doubler shown. Moreover, to obtain the desired RC constant, part or all of resistance 175 may be excluded from the described RC circuit without interfering with its signal-generating function, to be described, as by placing it adjacent diode 172, as represented in FIG. 5.

A particular advantage of providing brake control action in two stages, as by successive actuation of relays 210 and 220 in the present system, is that the delay circuit just described is not required to positively prevent any response whatever of the system to landing gear oscillation under all possible conditions of operation. It is sufficient that voltage decrease at load resistor 182 be delayed sufficiently to prevent actuation of first stage relay 210 under the conditions of landing gear oscillation most frequently encountered. That is true because valve 150 limits the rate of brake pressure reduction during first stage brake relief to a low value which does not significantly alter the rearward loading of the landing gear during a half-cycle of its oscillation. That limited rate preferably causes reduction of the brake pressure by approximately 20 to 60 percent of its existing value per second. For a typical landing gear period of 0.1 second, the brake pressure can then decrease by only about 1 to 3 percent during one half cycle.

With first stage brake relief of that type, and with full release of the brakes occurring only at a later stage, I have found that the occasional more extreme conditions of landing gear oscillation can safely be permitted to actuate the first stage of brake relief provided that actuation of the second stage of brake relief is positively prevented. That is accomplished in the present system by the integrating circuit, already described, which is interposed in the second stage control circuit and typically comprises resistor 232 and capacitor 240. That integrating circuit has the effect of further delaying actuation of second stage relay 220 after actuation of first stage relay 210, the magnitude of that delay being controllable by selection of the component values of the integrating circuit. I select those values so that under the most severe conditions of operation that is, when the initial wheel speed has its maximum value and decreases at maximum possible rate of deceleration, second stage relay 220 will not operate until after such wheel deceleration has continued for more than half the natural period of oscillation of the landing gear. The actual RC constant required for the integrating circuit, to provide that overall delay in second stage actuation, can be computed by straightforward procedures for an aircraft and a control system having known characteristics, or can be determined by direct operating test of the equipment. The actual time delay that must be produced by the integrating circuit depends in particular upon the magnitude of time delay in first stage actuation that is provided by the first stage delay circuit already described. For example, if such first stage delay circuitry is omitted entirely, as may be desirable to obtain maximum sensitivity of first stage operation, the described delay of at least one half cycle in operation of the brake releasing stage may be provided entirely by the integrating circuit associated with the signal input to that stage.

The present system not only prevents brake release in response to landing gear oscillation at its resonant frequency, as just explained, but includes means for preventing spurious response to an entirely distinct type of landing gear deflection. That is the non-resonant deflection that accompanies normal brake application. Consider an aircraft rolling freely with brake released, as may occur, for example, after an incipient skid has caused brake release and the wheel has just returned to normal speed. The landing gear is then free of brake load and may be considered to be in its undeflected equilibrium position. The wheel speed then corresponds to the rolling speed of the aircraft. As the brake is then reapplied, the landing gear deflects progressively under the increasing brake load. The wheel therefore moves rearwardly relative to the aircraft, and its rolling speed over the ground is less than that of the aircraft. Normal brake reapplication thus causes wheel deceleration.

A further factor causing wheel deceleration under the described conditions is the flexibility of the pneumatic tire. At a given speed over the ground, the tire flexibility makes the rotational speed of a braked wheel less than its free rolling speed. During brake application the wheel speed is therefore reduced progressively from free rolling speed to braked speed. The resulting deceleration is additive to that caused by progressive flexure of the landing gear.

In accordance with the present invention, the anti-skid brake control system is made unresponsive to wheel deceleration due to the combined action of tire flexure and landing gear deflection as the brake is reapplied by limiting the rate of reapplication of the brake pressure. That is accomplished in the present illustrative system by actuation of limiting valve 160 during brake reapplication, as already described. Pressure is supplied to the brake via actuated valve 160 at such a rate that the wheel deceleration produced by the described effects is less than the minimum value to which the control system is responsive. The most favorable actual rate of supply for accomplishing that purpose depends upon the particular characteristics of the aircraft and upon the sensitivity of the control system. Under typical conditions, I have found that the rate of pressure supply is preferably such that maximum braking pressure can be restored after brake release in from 0.5 to 1 second.

In preferred form of the invention, transistor 190 is a silicon transistor. In such transistors, when connected in the described type of circuit, the threshold bias voltage required on the base to given conduction decreases with increasing temperature. In accordance with one aspect of the present invention, that variation of threshold voltage is utilized to compensate the temperature variation of voltage produced by the described signal circuit for given rate of wheel deceleration. Due to the increase of resistivity of copper with temperature, and other known physical factors, the voltage produced by alternator 40 decreases with increasing temperature, so that the voltage signal supplied to the transistor base for a given rate of wheel deceleration also decreases with increasing temperature. I have discovered, however, that the threshold bias voltage decreases with increasing temperature by an amount that substantially compensates that decrease of input signal. By employing silicon transistors in the described system it is thus possible, without addition of complex and expensive special compensating circuits, to obtain substantially temperature independent operation whereby the transistor is shifted relatively abruptly from cut-off to conductive condition at a definite selected value of wheel deceleration.

In addition to the described types of control actions, means are provided in the present system for releasing the brake of any wheel which has substantially ceased to rotate. That control action, which will be referred to generally as the locked wheel control, takes place for each wheel independently of the condtion of rotation of the other wheels while the aircraft is airborne; but takes place following touch-down only under the condition that at least one of the other wheels is rotating faster than a predetermined critical speed. Otherwise the locked wheel control is disabled. That condition has the advantage that the brakes are not released through action of the locked-wheel control after the aircraft has come to a stop on the runway. The present system provides the particular advantage that the critical speed below which the locked-wheel control is thus disabled is appreciably higher than the wheel speed which is selected as a criterion for the locked condition of the wheel. The circuitry which determines disabling of the locked wheel control action is controlled by generator 40, whereas the output of rotation sensing generator 50 is utilized to sense locked condition of a wheel.

The alternating current output from rotation sensing generator 50 is supplied via leads 51, connector 24 and leads 51a as input signal to the base of a semiconductor amplifying device. That device is shown illustratively as the pnp junction transistor 250. The transistor emitter is connected to positive bus 204. The transistor collector is connected via the current limiting resistance 252 to negative bus 206, and also via the capacitance 256 to one input terminal of the full-wave rectifying device 260, typically comprising four junction diodes connected in a bridge network. The other input terminal of the bridge is connected via line 261 to negative bus 206.

The output from rectifier 260 is supplied via lines 262 and 263 to the winding 272 of the relay 270. A smoothing capacitor 266 is preferably connected between lines 262 and 263 to reduce the ripple of the rectified voltage. Relay 270 is thus actuated whenever wheel 110 is rotating faster than some critical speed at which the output from generator 50 is just sufficient, after amplification and rectification, to actuate the relay. It is highly advantageous for that critical wheel speed, which represents substantially locked wheel condition, to be as low as possible. With the novel structure that has been described for generator 50, and with the described electrical system, it has been found possible to obtain uniform and reliable operation of relay 270 at a critical wheel speed of approximately 25 revolutions per minute, which typically corresponds to from about 3 to about 5 miles per hour. The described circuitry has been found to be particularly sensitive, while retaining full reliability of operation.

Armature 273 of relay 270 of the control system for each wheel is connected to a common control bus 280, which is supplied with negative voltage under conditions to be described. Control bus 280 is connected in corresponding manner to the brake control systems for each of the other wheels of the vehicle, as indicated schematically by the arrow 281. The normally closed switch contact 276 of relay 270 is connected via line 279 in a manner to cause release of brake 114 in response to negative power supply to that line. In the present illustrative circuit, line 279 is connected to the negative terminal of the winding 212 of relay 210 and also to the negative terminal of winding 222 of relay 220. Interaction between the previously described transistor controlled circuits for those two relays is prevented by insertion of the diodes 275 and 277 in those respective connections.

Supply of negative voltage to control bus 280 is provided through two distinct mechanisms which respond to respective conditions. One such mechanism comprises the oleo switch 300 which is operated in known manner by the landing gear structure of the aircraft, as indicated schematically at 302. Switch 300 is closed during flight of the aircraft and is opened by movement of the landing gear in response to loading of the landing wheels. Control bus 280 is connected via the line 282 and switch 300 to the negative voltage supply, shown schematically as ground for convenience of illustration. Control bus 280 thus receives negative voltage from power source 200 via oleo switch 300 whenever the aircraft is in the air. Hence, under that condition, release of relay 270 in response to substantial locking of any wheel causes release of the brake for that wheel.

Control bus 280 is also provided with negative voltage, upon actuation of the relay 290, via the line 284, normally open contact 294 of the relay 290 and grounded line 285. Arming relay 290 is controlled in accordance with the direct current voltage standing on resistance 175, already described. That voltage is derived from generator 40 and is substantially proportional to the speed of rotation of wheel 110. As illustratively shown, a line 288 is connected to the junction of resistance 175 and line 176 and is similarly connected in the control system of each wheel of the vehicle, as indicated by the arrow 289. A unidirectional device, shown as the junction diode 287, is inserted in the portion of line 288 adjacent resistor 175 in each system to prevent interaction of the respective signal sources. The control signal from line 288 is supplied to the base of the npn transistor 297 via the resistance 294. The transistor collector is connected via the winding 292 of relay 290 and line 295 to positive bus 204. The emitter is connected via the resistance 296 to ground, which is equivalent to negative bus 206.

Satisfactory operation of relay 290 in response to wheel speed exceeding a critical value of approximately 200 to 500 r.p.m. can be obtained with the described circuitry with resistance 175 as small as about one-fifth to one-tenth of resistance 182. Utilization of the voltage signal on resistance 175 for control of relay 290 therefore does not appreciably affect the described control of valve system 130 in accordance with changes of the voltage on resistor 182.

During the initial portion of the landing run, while the rate of wheel rotation exceeds the critical value for actuation of arming relay 290, typically approximately 300 r.p.m., the relay switch remains closed, supplying negative voltage to control bus 280 and arming the locked wheel control system for its operation already described. As the aircraft slows below that critical arming speed, the arming circuit is opened at relay contact 294, disabling the locked wheel control action. That disabling action may be further delayed, if desired, by means of any suitable mechanism for delaying the release of relay 290. Such means are typically represented by the resistance 298 and the capacitor 299 which are series connected in shunt to relay coil 292, and which may typically provide a time delay of approximately 0.5 to 2 seconds in the release of the relay. That delay period is made less than the time required for the aircraft to slow from the described critical arming speed to a full stop; but provides useful locked wheel control for an adequate period in case all wheels stop momentarily due to extreme skid conditions.

If, for any reason, the speed of rotation of wheel 110 drops below the critical locked wheel speed, which typically means in effect that the wheel has locked, relay 270 is released. Line 279 is thereby connected to control bus 280. If that bus is receiving negative power through one of the described circuits, relays 210 and 220 are immediately actuated, causing brake release in the manner already described. That action results, for example, when the aircraft is in the air and control bus 280 is receiving negative power via closed oleo switch 300. Also, during the course of the landing run, when the latter circuit is open, the described brake release action for wheel 110 takes place provided any one of the other wheels is rotating at more than the critical arming speed for actuation of arming relay 290, since control bus 280 is then supplied with negative power via that relay in the system of the rotating wheel. Accordingly, the overall control action of the locked wheel control is to cause release of brake 114 whenever wheel 110 becomes effectively locked provided the aircraft is air borne, or, if not air borne, provided one of the other landing wheels of the aircraft is not locked and is rotating faster than the critical arming speed. After the aircraft has been substantially or wholly brought to rest, the latter condition is not satisfied. Brake releasing action of the locked wheel control is therefore disabled, insuring the pilot normal manual control of the brake system.

After brake 114 has been released by the described action of relay 270 is response to substantial locking of the wheel, it is desirable to apply the brake again as soon as is practicable after the wheel has returned to normal speed. However, an appreciable time period is required after the wheel has reached the critical speed at which relay 270 is again actuated before normal wheel speed is attained. Continued brake release during that period is insured in the present system by a time delay circuit which comprises the resistor 308 and the capacitor 309 series-connected between line 279 and negative bus 206. Whenever the brakes are released via line 279 and relay 270, capacitor 309 becomes charged. Upon reactuation of the relay, the capacitor discharges through resistance 308 and the windings of relays 210 and 220, maintaining actuation of those relays for a predetermined time period. When those relays are finally released, valve system 130 is shifted to its intermediate condition in which control valve 160 is closed and braking pressure can be applied to the wheel only at a limited rate. That restricted rate of brake application is then maintained for a predetermined time period, controlled by capacitor 244 and resistor 242 as already described. Thereafter valve system 130 returns to normal condition. The gradual nature of the brake reapplication, in addition to the advantages already described, has the further advantage that after recovery from a locked wheel condition it permits brake reapplication to be initiated earlier than would otherwise be feasible. Accordingly, the time delay provided by resistor 308 and capacitor 309, as already described, may not be required, and in any case can be appreciably shorter than would be necessary if the braking pressure were reapplied rapidly.

The control system of FIG. 4 includes fail-safe mechanism for preventing the brake from being held in released condition for an excessive period of time due to electronic or mechanical failure of the system. That fail-safe mechanism, which controls all wheels of the aircraft, includes the main switch 310, the fail-safe relay 320 and circuit means for idling the relay in response to excessive brake releasing action by the system. Switch 310 comprises two contacts, 312 and 314, and respective contact arms 313 and 315. The latter are connected via the common line 317 to the positive side of power supply 200. In normal open position of the switch, contacts 312 and 314 are both open. Pressure on the operating member 316 closes arm 313 to contact 312; and overtravel of member 316 also closes arm 315 to contact 314. Release of member 316 then permits resilient means indicated schematicaly at 318 to return arm 315 to open position, leaving the switch in normal operating position as shown in FIG. 4. The switch may then be fully opened by reverse movement of control member 316; or arm 315 may be again closed momentarily to contact 314 by repeated manual over-travel of member 316.

Switch contact 314 is connected via line 319 to positive bus 204 of the brake control system for each wheel, as indicated by the arrowhead at 321. Contact 314 is also connected via the winding 322 of relay 320 and the current limiting resistor 328 to negative power line 206. Hence relay 320 is actuated in response to over-travel movement of switch control element 316. The relay has two switch arms 323 and 325. Switch arm 323 is connected to contact 312 of switch 310, and its normally open contact 324 is connected to line 319. Hence relay actuation closes a holding circuit which remains operative unless switch 310 is returned to open position. Relay switch arm 325 is connected to line 317 and its normally closed contact 326 is connected via a signal means, indicated as a signal lamp 330, to negative supply 206. Hence release of relay 320 energizes signal 330, indicating that the entire brake control system is idle due to failure to receive positive voltage.

A control circuit under control of an amplifying device is connected in shunt to winding 322 of relay 320. That amplifying device is shown illustratively as the npn junction transistor 340, which has its collector connected to line 319 and its emitter to the junction of winding 322 and resistor 328. A control signal is supplied to the base of transistor 340 via the line 342. In the present embodiment control signals are supplied to line 342 from computing networks provided in the control system for each wheel brake, and shown typically in the right hand portion of FIG. 4.

That computing network comprises the resistance 344 and the capacitance 346, which are series connected between line 216 and negative bus 206. Whenever line 216 is connected to positive bus 204 by brake relieving actuation of relay 210, capacitor 346 is progressively charged at a rate which is determined by selection of resistance 344. A discharge path for capacitor 346 to negative bus 206 is provided via the parallel-connected resistor 348. Hence during actuation of relay 210, the voltage on capacitance 346 approaches asymptotically to the equilibrium value represented by the junction 345 of resistors 344 and 348, acting as a voltage divider. The voltage at that junction is supplied to line 342 as input signal for transistor 340. Uni-directional devices, shown as the junction diodes 350 and 352, are inserted between line 216 and resistance 344, and between junction 345 and line 342, respectively. Line 342 is similarly connected, as indicated at 343, to a corresponding computing mechanism in the control system for each wheel of the vehicle, diode 352 preventing unwanted interaction between those computing networks. Diode 350 prevents discharge of capacitance 346 through solenoid windings 142 and 162 of valve system 130 when relay 210 is released.

Under normal operating conditions, cut-off bias for transistor 340 is provided by the voltage drop through resistor 328 caused by the holding current in relay 320. The value of that bias and of the various components of the computing network are selected so that capacitance 346 charges to a potential sufficient to overcome that bias only after relay 210 has remained actuated for a desired predetermined time period, typically from 3 to 6 seconds. That time is made long enough that it will not ordinarily be exceeded during any anticipated braking condition so long as the system is working properly. If mechanical or electrical failure of the system should cause the brake to remain released for a longer period, the voltage on capacitor 346 reaches the critical value at which transistor 340 becomes conductive. Relay winding 322 is thereby effectively shorted through the control circuit, releasing the relay and opening the main power circuit at relay contact 324. Control of brake 114 is thereby returned to full manual control at lever 126. That condition is indicated to the pilot by signal lamp 330. The system may again be put into operation by normal actuation of switch 316, over-travel of which closes contact 314. If the malfunction has been corrected, the system will then operate normally; if not, the continuing malfunction may again cause release of the brakes, but only for the predetermined time period set by the computing network. If that time is exceeded, the fail-safe signal will again cause release of relay 320, restoring the brakes to manual control.

While the aircraft is still airborne, the brakes are typically released through the described action of the locked wheel control. It is ordinarily desirable that brake release under that condition, which typically may continue for many seconds, cannot actuate the fail-safe system. That is accomplished in the system of FIG. 4 by providing a circuit connection that disables the fail-safe system so long as the oleo switch is closed, that is, while the aircraft is airborne. As illustrated, line 342 is connected via the line 354 and the diode 356 to line 282, which is grounded whenever oleo switch 300 is closed. Capacitance 346 is thereby maintained in discharged condition until the oleo switch opens after touchdown.

FIG. 5 is a fragmentary schematic diagram representing an illustrative modification of the system of FIG. 4. That modification relates primarily to the mechanism for controlling actuating solenoid 142 and control solenoid 162 to relieve the brake and to control its reapplication, respectively, in response to signals derived from the output of alternator 40. In FIGS. 4 and 5 corresponding parts are indicated by the same numerals, and certain portions of the system of FIG. 4 which are not directly involved in the present modified system are omitted from FIG. 5 for clarity of illustration. The circuitry for energizing control solenoid 152 to fully release the brake, typically including transistor 230 and relay 220 of FIG. 4, is indicated in block form at 360 in FIG. 5.

In the system of FIG. 5 a voltage is developed across the resistances 175 and 182 substantially as already described in connection with FIG. 4. However, resistance 175 is shown illustratively in such position that it is excluded from the discharge circuit for capacitors 173 and 174, and hence does not contribute to the RC constant for that circuit. That arrangement is sometimes useful to permit greater freedom in selection of component values to satisfy other circuit requirements.

Capacitance 180 is connected in shunt to resistance 182, as before, but the series-connected diode 192 of FIG. 4 is replaced in FIG. 5 by the two series resistances 362 and 364. The voltage developed across resistance 362 is rectified by the full wave rectifying bridge 366, typically comprising four semiconductor diodes. The negative output terminal 367 of that rectifier is connected to negative bus 206; and the positive terminal 368 is connected to the base of transistor 190. With that arrangement, any change in speed of the braked wheel, and hence of alternator 40, produces a voltage drop across resistance 362, and the rectifier makes terminal 368 positive for both wheel acceleration and wheel deceleration. If the rate of change of wheel speed exceeds a definite threshold value, transistor 190 becomes conductive, actuating relay 210. Such relay actuation is typically arranged to occur in response to a rate of wheel deceleration exceeding approximately two-fold the maximum rate during normal braking action, and also occurs in response to the same rate of wheel acceleration.

That action is further conditioned, in the present embodiment, by circuitry acting to disable relay 210 when the wheel acceleration reaches a value corresponding to normal recovery from an incipient skid. That rate of acceleration is typically much larger than the threshold rate of wheel deceleration at which relay 210 is actuated. As illustratively shown, that control circuitry comprises the transistor 370 and the relay 380. The transistor emitter is connected via the line 372 to negative bus 206, and its collector is connected via the winding of relay 380 and line 373 to positive bus 204. The transistor base receives a control signal via the resistance 374 from junction of resistors 175 and 182. The signal limiting resistance 376 is connected between base and emitter of the transistor.

During wheel deceleration, the voltage drop in resistance 364 due to discharge of capacitance 180 maintains the base of transistor 370 negative with respect to the emitter, idling relay 380. During wheel acceleration, the charging current to capacitance 180 tends to make the transistor base positive. By suitable selection of the ratio of resistances 374 and 376, as well as other components of the system, transistor 370 can be made to actuate relay 380 at any desired rate of wheel acceleration. That critical rate for actuation of relay 380 is preferably made appreciably greater than the rate of acceleration at which relay 210 is actuated via transistor 190.

Relay 380 has two normally open switches, of which 383 is connected directly in shunt to resistance 362, so that relay actuation shorts out rectifier bridge 366, cutting off transistor 190 and releasing relay 210. The second switch 386 of relay 380 supplies positive voltage from bus 204 via the line 390 to control solenoid 162, maintaining actuation of control valve 160 (FIG. 4) independently of the condition of relay 210. The time delay net work 242, 244, already described in connection with FIG. 4, as illustratively shown in FIG. 5. However, it typically is not required to produce as long a delay in the release of solenoid 162 as is desirable in the previously described system, and it may even be omitted entirely.

In operation of the system of FIG. 5, abnormal wheel deceleration energizes actuating solenoid 142 and control solenoid 162 via relay 210 relieving the brake; and, if the incipient skid is severe, control solenoid 152 is energized via means 360, fully releasing the brake. After the skid has been controlled, the wheel accelerates back toward normal speed. If that acceleration proceeds at a moderate rate, as is typically true on a wet or oily runway for example, the charging current to capacitor 180 maintains actuation of relay 210, delaying reapplication of the brakes until substantially normal wheel speed is reestablished. Then transistor 190 is cut off, idling solenoids 142 and 152. Reapplication control solenoid 162 remains energized via delay network 242, 244, limiting the rate of brake reapplication for a predetermined time period. The described delay in initiating brake reapplication until substantial recovery from a skid, followed by limited braking for a further time period, is remarkably effective in preventing recurrence of a skid from which recovery is abnormally slow.

When recovery from the skid is rapid, as is usually the case on a normal runway surface, the relatively rapid wheel acceleration charges capacitance 180 rapidly, firing transistor 370. Transistor 190 is thereby cut off via relay 380, idling relay 210. Brake reapplication is thereby initiated during the phase of rapid wheel acceleration. However, the rate of such reapplication is limited via control solenoid 162 which remains energized via relay 380 and line 390 throughout the phase of rapid wheel acceleration. As the wheel reaches normal speed, relay 380 is released. The limited rate of brake reapplication then continues for the delay time set by network 242, 244. Thereafter the brake is restored to full manual control.

It is sometimes useful to restore the full metered braking pressure more rapidly under conditions of rapid wheel recovery, while maintaining the described gradual reapplication of brake pressure when the wheel acceleration is abnormally slow. That may be accomplished, for example, by omitting line 390 of FIG. 5. Switch 386 of relay 380 may then also be omitted. With that modification, the time delay period for solenoid 162 begins at actuation of relay 380 during the rapid phase of wheel recovery, rather than at release of relay 380 following that recovery. The end of the delay period, and the return to full brake pressure, occurs correspondingly early.

Figure 6:
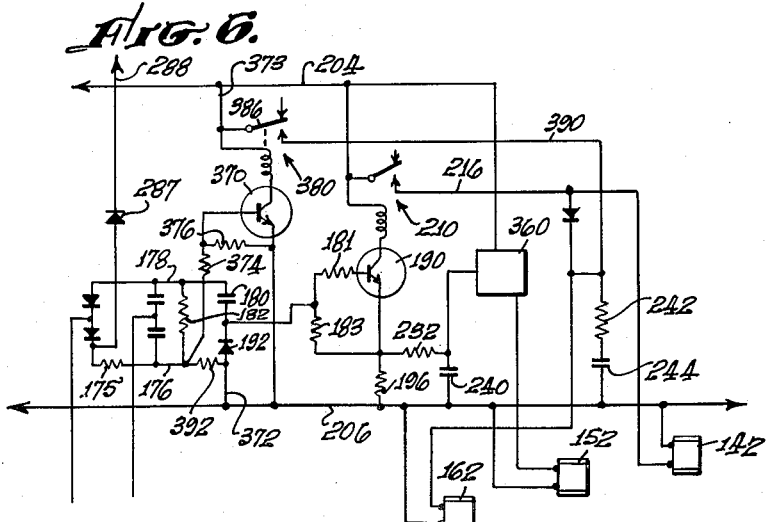
FIG. 6 is a fragmentary schematic drawing corresponding to a portion of FIG. 4 and representing a further modification.

A further illustrative modification of the system of FIG. 5 is shown schematically in FIG. 6. The rectifying bridge 366 of FIG. 5 is omitted, and transistor 190 receives its control signal substantially as in FIG. 4 only during wheel deceleration, the unidirectional device 192 permitting rapid charging of capacitance 180. The resistance 392 is connected between diode 192 and line 176, corresponding in many respects to resistance 364 of FIG. 5. The junction between diode 192 and resistance 392 is connected via line 372 to grounded negative bus 206. The control signal for transistor 370 is taken from resistance 392, and controls relay 380 as already described. That relay has only the single switch 386, which energizes control solenoid 162 via line 390 as in FIG. 5. Portions of the system are omitted from FIG. 6 for clarity of illustration, and may be as shown in FIG. 4.

In operation of the system of FIG. 6, the brakes are relieved during an incipient skid typically as described in connection with FIG. 4, recovery control solenoid 162 being energized via relay 210. After the skid is controlled and wheel deceleration ceases, relay 210 is released, permitting brake reapplication at the limited rate controlled by solenoid 162 and its valve 160. During wheel acceleration following a skid, the charging current to capacitance 180 produces a voltage drop in resistance 392 of FIG. 6, rendering transistor 370 conductive and actuating relay 380. Resistances 374, 376 and 392 and other circuit components are preferably so selected that the threshold value of wheel acceleration above which relay 380 is actuated is less than the lowest value ordinarily associated with recovery from a skid. Thus relay 380 is typically actuated during both normal skid recovery and the relatively slow skid recovery already mentioned in connection with FIG. 5. Delay network 242, 244 maintains energization of control solenoid 162 during the brief time between the end of the deceleration signal at transistor 190 and the start of the effective acceleration signal at transistor 370. A time delay of 0.05 to 0.1 second is typically sufficient for that purpose. Solenoid 162 then remains energized via transistor 370, limiting the rate of brake reapplication substantially throughout the period of wheel recovery.

It will be understood that the particular embodiments that have been described are intended only as illustration of the invention. Many changes may be made in the particulars of those embodiments without departing from the proper scope of the invention, which is defined in the appended claims.

I claim:

1. In a control system for a brake of an aircraft wheel which is carried by longitudinally flexible landing gear structure having a predetermined natural period of oscillation, the combination of means driven in accordance with rotation of the braked wheel for developing an alternating current voltage substantially proportional to the speed of the wheel, rectifying means responsive to the alternating current voltage and acting to produce a corresponding direct current voltage, delay circuit means acting to limit the rate of decrease of the output voltage of said rectifying means and having an RC constant exceeding half the natural period of the landing gear structure, differentiating circuit means acting to differentiate the resulting output voltage and to produce an electrical signal which corresponds to the rate of decrease thereof, and means actuable to relieve the brake in response to said signal.

2. The combination defined in claim 1, wherein said rectifying means comprises a voltage-multiplying rectifying circuit which includes capacitance in shunt to its output, and wherein said delay circuit means includes resistance means connected in shunt to the output of the rectifying circuit, said capacitance and resistance having an RC constant exceeding half the natural period of the landing gear structure.

3. The combination defined in claim 2, wherein said differentiating circuit means comprises a capacitance and a resistance series connected in shunt to a portion only of said resistance means, and circuit means responsive to current flow in said resistance.

4. In a control system for a brake of an aircraft wheel which is carried by longitudinally flexible landing gear structure having a predetermined natural period of oscillation, the combination of means driven in accordance with rotation of the braked wheel for developing an alternating current voltage substantially proportional to the speed of the wheel, rectifying means responsive to the alternating current voltage and acting to produce a corresponding direct current voltage, delay circuit means acting to limit the rate of decrease of the output voltage of said rectifying means and having an RC constant exceeding half the natural period of the landing gear structure, differentiating circuit means acting to differentiate the resulting output voltage and to produce a first electrical signal which corresponds to the rate of decrease thereof, means actuable to relieve the brake in response to said signal, second delay circuit means responsive to said first signal and acting to derive therefrom a second electrical signal, the second delay circuit means having an RC constant exceeding half the natural period of the landing gear structure, and means actuable to release the brake in response to said second signal.

5. In a brake control system for a vehicle wheel that is subject to a predetermined range of normal working temperatures, the combination of means actuable to relieve the brake, an electromagnetic alternator driven in accordance with the wheel speed and developing an alternating current voltage having an amplitude that is substantially proportional to the wheel speed throughout said speed range at given temperature and that decreases with increasing temperature, circuit means for deriving from the alternating current voltage a direct current control voltage substantially proportional to the rate of decrease thereof, a silicon transistor having a collector-emitter output circuit, the threshold bias voltage for rendering the transistor conductive decreasing with increasing temperature, means for supplying the control voltage to the base of the transistor, said amplitude decrease of the alternating current voltage and said bias decrease of the transistor being substantially proportional, and control means acting in response to a definite value of current in said output circuit to actuate the brake relieving means.

6. In a control system for a vehicle wheel brake, the combination of means driven in accordance with rotation of the braked wheel for developing a voltage substantially proportional to the speed of the wheel, circuit means acting to differentiate said voltage and to produce a first electrical signal which is substantially proportional to the rate of change of the wheel speed, circuit means responsive to the first signal and acting to produce a second electrical signal which is substantially proportional to the time integral of the first signal, and means actuable to relieve the brake in response to said second signal exceeding a predetermined value.

7. In a control system for a vehicle wheel brake, the combination of means driven in accordance with rotation of the braked wheel for developing a voltage substantially proportional to the speed of the wheel, circuit means acting to differentiate said voltage and to produce a first electrical signal which is substantially proportional to the rate of change of the wheel speed, circuit means responsive to the first signal and acting to produce a second electrical signal which is substantially proportional to the time integral of the first signal, means actuable to arrest brake actuation in response to said first signal exceeding a predetermined value, and means actuable to release the brake in response to said second signal exceeding a predetermined value.

8. In a control system for a vehicle wheel brake normally actuable in response to fluid pressure, the combination of means for producing an electrical control signal substantially proportional to the rate of deceleration of the braked wheel, first amplifying means responsive to variations in the control signal and acting to produce a first direct current that is substantially proportional to the control signal, second amplifying means responsive to variations in the control signal and acting to produce a second direct current that is substantially proportional to the time integral of the control signal, means actuable in response to a predetermined value of the first said current to arrest the supply of fluid pressure to the brake, and means actuable in response to a predetermined value of the second said current to release the brake.

9. In a control system for a vehicle wheel brake normally actuable in response to fluid pressure, the combination of a first transistor, means driven by the wheel and acting to supply to the transistor a first control signal substantially proportional to the rate of deceleration of the braked wheel, circuit means including a source of electric power and forming an output circuit for the transistor wherein the current corresponds to said control signal, a second transistor, means responsive to said current and acting to supply a second control signal to the second transistor, circuit means including a source of electric power and forming an output circuit for the second transistor wherein the current corresponds to the second control signal, means actuable in response to a predetermined value of the first said current to arrest the supply of fluid pressure to the brake, and means actuable in response to a predetermined value of the second said current to release the brake.

10. The combination defined in claim 9, and in which said means for supplying a control signal to the second transistor includes time delay means for causing that control signal to lag behind the first said current.

11. The combination defined in claim 9, and including also means actuable to restore fluid pressure to the brake at a limited rate in response to decrease of one of the said currents below its said predetermined value.

12. The combination defined in claim 9, and including also means actuable to restore fluid pressure to the brake in response to decrease of the first said current below its said predetermined value, and means for limiting the rate of such restoration of fluid pressure during a predetermined time interval.

13. In a control system for a vehicle wheel brake normally actuable in response to fluid pressure supplied to the brake, the combination of a first transistor, means driven by the wheel and acting to supply to the base of the transistor a first control signal substantially proportional to the rate of deceleration of the braked wheel, circuit means including a source of electric power and connected between the emitter and collector of the transistor to form an output circuit for the transistor wherein the current corresponds to the control signal, a second transistor, means including a resistance in series with said output circuit and acting to supply a second control signal to the base of the second transistor, circuit means including a source of electric power and connected between the emitter and collector of the second transistor to form an output circuit therefor wherein the current corresponds to the second control signal, means actuable in response to a predetermined value of the first said current to arrest the supply of fluid pressure to the brake, and means actuable in response to a predetermined value of the second said current to release the brake.

14. The combination defined in claim 13, and in which said means for supplying a control signal to the second transistor includes impedance means connected between said resistance and that transistor base and a capacitance connected in shunt to the input circuit of that transistor.

15. In a control system for a vehicle wheel brake normally actuable in response to fluid pressure supplied from a pressure source, the combination of multiple-position valve means connected between the source and the brake and normally providing substantially free communication therebetween, said valve means being actuable selectively to a first position providing release of fluid pressure from the brake, and to a second position providing supply of fluid pressure to the brake only at a restricted rate, sensing means controlled by the wheel rotation and acting to produce a control signal in response to a predetermined degree of wheel deceleration, first coupling means for actuating the valve means to said first position in response to the control signal, and second coupling means for actuating the valve means to said second position in response to termination of the control signal.

16. A brake control system as defined in claim 15, and including also timing means initiated in action by said second coupling means and acting to maintain the valve means in said second position during a predetermined time period.

17. A brake control system as defined in claim 15, and including also recovery sensing means acting to produce a recovery signal in response to wheel acceleration, and means for maintaining the valve means in said second position under control of the recovery signal.

18. A brake control system as defined in claim 17, and in which the last said means includes timing means acting to maintain the valve means in said second position during a predetermined time period after termination of the recovery signal.

19. In a control system for a vehicle wheel brake normally actuable in response to fluid pressure supplied from a pressure source, the combination of multiple-position valve means connected between the source and the brake and normally providing substantially free communication therebetween, said valve means being actuable selectively to a first position providing restricted release of fluid pressure from the brake, to a second position providing substantially complete release of fluid pressure from the brake, and to a third position providing restricted supply of fluid pressure to the brake, sensing means controlled by the wheel rotation and acting to produce successively first and second signals in response to respective predetermined first and second degrees of wheel deceleration, first coupling means for actuating the valve means to said first position in response to said first signal and to said second position in response to said second signal, and second coupling means acting in response to termination of one of said signals to actuate the valve means to said third position.

20. In a control system for a vehicle wheel brake normally actuable in response to fluid pressure supplied from a pressure source, brake relieving means actuable to reduce the fluid pressure at the brake, sensing means for producing a signal in response to wheel deceleration exceeding a critical rate, coupling means for actuating the brake relieving means in response to the signal, means acting in response to termination of the signal to restore fluid pressure to the brake, and timing means acting to restrict the rate at which pressure is restored to the brake during such pressure restoration until termination of a predetermined time period.

21. In a control system for a vehicle wheel brake normally actuable in response to fluid pressure supplied from a pressure source, brake relieving means actuable to reduce the fluid pressure at the brake, sensing means for producing a signal in response to wheel deceleration exceeding a critical rate, coupling means for actuating the brake relieving means in response to the signal, means acting in response to termination of the signal to restore fluid pressure to the brake, second sensing means responsive to wheel acceleration, and means acting to restrict the rate at which pressure is restored to the brake during said pressure restoration under control of the second sensing means.

22. In a control system for a vehicle wheel brake normally actuable in response to fluid pressure supplied from a pressure source, brake relieving means actuable to reduce the fluid pressure at the brake, first sensing means for producing a signal in response to wheel deceleration exceeding a critical deceleration rate and in response to wheel acceleration exceeding a first critical acceleration rate, coupling means normally actuating the brake relieving means in response to said signal, second sensing means for producing a second signal in response to wheel acceleration exceeding a second critical acceleration rate that is greater than said first critical acceleration rate, means actuable to restore fluid pressure to the brake at a restricted rate, and second coupling means acting in response to the second signal to terminate said actuation of the brake relieving means and to actuate the pressure restoring means.

23. In a control system for a vehicle wheel brake normally actuable in response to fluid pressure supplied from a pressure source, brake relieving means actuable to reduce the fluid pressure at the brake, first sensing means for producing a first signal in response to wheel deceleration exceeding a critical value, means for actuating the brake relieving means in response to said signal, means actuable to restore pressure to the brake, second sensing means responsive to wheel acceleration and acting to produce a first acceleration signal in response to rates of wheel acceleration representing abnormally slow recovery from a skid condition, and to produce a second acceleration signal in response to rates of wheel acceleration representing normal recovery from a skid condition, first coupling means for maintaining actuation of the brake relieving means in response to the first acceleration signal, and second coupling means for terminating actuation of the brake relieving means and for actuating the pressure restoring means in response to the second acceleration signal.

24. In a control system for a vehicle wheel brake normally actuable in response to fluid pressure supplied from a pressure source, brake relieving means actuable to reduce the fluid pressure at the brake, an electrical capacitance, means responsive to wheel rotation and acting to charge the capacitance to a potential that is substantially proportional to the rate of wheel rotation, rectifying means responsive to the capacitance current and acting to produce an electrical signal having fixed polarity for both directions of the capacitance current and having a magnitude corresponding to the magnitude of said current, means for amplifying said signal of fixed polarity, and coupling means for actuating the brake relieving means in response to said amplified signal exceeding a critical value.

25. In a brake control system for a vehicle wheel having a normal operating range of wheel speed, the combination of a first electromagnetic alternator driven in accordance with the wheel speed and developing a first alternating current signal substantially proportional to the wheel speed throughout said speed range, a second electromagnetic alternator driven in accordance with the wheel speed and developing a second alternating current signal that reaches substantial saturation within the lower quarter of said speed range, circuit means actuating to derive from the first signal a direct current signal substantially proportional to the rate of decrease thereof, means actuable to relieve the brake, first control means for actuating the brake relieving means in response to values of said direct current signal that exceed a predetermined critical value that corresponds to abnormally fast wheel deceleration, and second control means for actuating the brake relieving means in response to values of said second alternating current signal that are less than a predetermined critical value that corresponds to substantially zero rate of wheel rotation.

26. In a brake control system for an aircraft wheel having a normal operating range of wheel speed, the combination of a first electromagnetic alternator driven at the speed of the wheel, said alternator developing a first alternating current signal having a frequency less than ten times the rotation frequency and having an amplitude that increases with rotation frequency at a substantially uniform rate throughout said speed range, a second electromagnetic alternator driven at the speed of the wheel and developing a second alternating current signal having a frequency of at least sixteen times the rotation frequency and having an amplitude that initially increases with rotation frequency at a rate exceeding the said rate for the first alternator and that reaches substantial saturation within the lower quarter of said speed range, a locked wheel relay and an arming relay, first control circuit means for actuating the arming relay in response to the first signal exceeding a predetermined critical value that corresponds to an appreciable wheel speed, second control circuit means for actuating the locked wheel relay in response to the second signal exceeding a predetermined critical value that corresponds to a wheel speed close to zero at which the first signal has an impracticably low frequency and amplitude, means actuable to relieve the brake, and circuit means for actuating the brake relieving means and including in series a normally closed switch of the locked wheel relay and a normally open switch of the arming relay.

27. In a control system for a vehicle wheel brake, which system comprises generating means for producing an alternating current having a frequency proportional to the wheel speed, and means for relieving the brake under control of said current; the improvement characterized by the fact that said generator means comprise a permanent magnet of annular shape magnetized axially, an electrical winding mounted coaxially of the magnet adjacent one of its radial surfaces, a rotor journaled for rotation about the magnet axis, said rotor having an axial face that is closely spaced from one pole face of the magnet, and the rotor having a generally cylindrical radial surface, core structure fixedly mounted with respect to the magnet and having a generally cylindrical radial surface spacedly opposed to the radial surface of the rotor, the rotor, core structure and magnet forming a magnetic circuit that threads the winding, the said radial surfaces of the rotor and core structure having equal pluralities of channels uniformly distributed circumferentially and extending the entire axial width of said surfaces, the channels of each plurality being wider in a circumferential direction than the intervals between the channels of the other plurality, and means for driving the rotor in accordance with the wheel speed.

28. The improvement defined in claim 27, and including also a thrust bearing acting directly between the rotor and the magnet.

29. In a brake control system for a vehicle having a plurality of braked wheels, the combination of a plurality of electrical generating means driven in accordance with the speeds of rotation of the respective wheels and developing respective control voltages representing said speeds, a plurality of wheel relays associated with the respective wheels, control circuit means for each of the wheel relays, acting under control of a control voltage for that wheel to actuate the relay in response to said voltage exceeding a first predetermined critical value that corresponds to a first critical wheel speed, a common relay, control circuit means for the common relay acting under joint control of control voltages for all the wheels to actuate the common relay in response to any one of said voltages exceeding a second predetermined critical value that corresponds to a second critical wheel speed, the second wheel speed being greater than the first, brake relieving means for each of the wheels actuable to relieve the associated wheel brake, and coupling circuit means for actuating the respective brake relieving means, each coupling circuit means including in series a normally closed switch of the associated wheel relay and a normally open switch of the common relay.

30. The combination defined in claim 29, and including also a plurality of circuit means associated with the respective wheels, each of the last said circuit means acting to develop a control signal in response to decrease of a control voltage for the corresponding wheel at a rate that exceeds a predetermined critical value, and coupling circuit means for each wheel acting in response to the corresponding control signal to actuate the brake relieving means for that wheel independently of said relays.

31. In a control system for a brake of an aircraft wheel which is carried by longitudinally flexible landing gear structure having a predetermined natural period of oscillation, the combination of means driven in accordance with rotation of the braked wheel for developing a voltage substantially proportional to the speed of the wheel, circuit means acting to differentiate said voltage and to produce a first electrical signal which is substantially proportional to the rate of wheel deceleration, means actuable to arrest brake actuation in response to said first signal, second circuit means responsive to the first signal and acting to produce a second electrical signal that increases with said first signal, means actuable to release the brake in response to said second signal exceeding a predetermined value, and delay circuit means acting to prevent said second signal from reaching said predetermined value until wheel deceleration has continued for at least about one half of said natural period of oscillation of the landing gear structure.

32. In a control system for a brake of an aircraft wheel which is carried by longitudinally flexible landing gear structure having a predetermined natural period of oscillation, the combination of means driven in accordance with rotation of the braked wheel for developing a voltage substantially proportional to the speed of the wheel, circuit means acting to derive from said voltage an electrical signal responsive to wheel deceleration, means actuable to release the brake under control of said signal, and delay circuit means acting to delay actuation of the last said means until wheel deceleration has continued for at least about one half of said natural period of oscillation of the landing gear structure.

33. In a control system for a brake of an aircraft wheel which is carried by longitudinally flexible landing gear structure and which includes a flexible pneumatic tire, the brake being normally actuable in response to fluid pressure supplied from a pressure source, flexure of said landing gear and tire in response to increasing brake pressure causing wheel deceleration; the combination of sensing means responsive to wheel deceleration exceeding a critical value, brake relieving means actuable under control of the sensing means to reduce the fluid pressure at the brake, means actuable to resupply fluid pressure to the brake following actuation of the brake relieving means, and means acting to limit the rate of said pressure resupply to a rate at which the wheel deceleration caused by said flexure of the landing gear and tire is less than said critical value.

34. In a brake control system for a vehicle having a plurality of braked wheels, a plurality of brake relieving means associated with the respective wheels and actuable independently to relieve the brake of the associated wheel, a plurality of sensing means responsive to the speeds of the respective wheels, first control means for the respective wheels normally acting under control of the sensing means to actuate each brake relieving means in response to rotation of its associated wheel at less than a first critical wheel speed, and second control means acting under joint control of the sensing means to disable the first control means in response to the individual speeds of every one of said wheels falling below a second critical wheel speed, the second wheel speed being greater than the first.

35. In combination with an anti-skid control system for a vehicle wheel brake normally actuable under manual control, said control system comprising sensing means responsive to a condition of wheel rotation, brake relieving means electrically actuable to relieve the brake, a power bus, a source of electrical power normally connected to the power bus, and circuit means acting under control of the sensing means to supply electric power from said power bus to the brake relieving means to actuate the same; the improvement which comprises a relay having a normally open switch connected in series between the source and the power bus and actuable to isolate the anti-skid control system from the source on release of the relay, holding circuit means normally supplying holding current to the relay winding to hold the switch closed, timing means responsive to abnormally prolonged actuation of the brake relieving means, the timing means comprising a capacitance and means acting to charge the capacitance at a limited rate during periods of actuation of the brake relieving means, and means for disabling the holding circuit means in response to a predetermined value of the voltage on the capacitance to isolate the power bus from the source.

36. In a control system for a vehicle wheel brake normally actuable in response to fluid pressure supplied from a pressure source, the combination of signal means for producing a continuously variable electrical signal, the value of said signal increasing continuously with increasing rate of deceleration of the braked wheel, valve means connected between the source and the brake and normally providing substantially free communication therebetween, said valve means being actuable to a plurality of actuated positions in which the brake pressure is relieved by respective different amounts, and control means acting to move the valve means successively to said actuated positions in response to respective successively increasing values of said continuously variable electrical signal.

37. In a control system for a vehicle wheel brake normally actuable in response to fluid pressure supplied from a pressure source, the combination of means driven with the wheel for producing a voltage that varies continuously with the wheel speed, means for deriving from said voltage a continuously variable electrical signal that increases continuously with increasing rate of deceleration of the braked wheel, valve means connected between the source and the brake and normally providing substantially free communication therebetween, said valve means being actuable to a plurality of actuated positions in which the brake pressure is relieved by respective different amounts, and control means acting to move the valve means successively to said actuated positions in response to respective successively increasing values of said continuously variable electrical signal.

References Cited in the file of this patent

UNITED STATES PATENTS

| Number | Name | Date |
|---|---|---|
| 2,251,973 | Beale et al. | Aug. 12, 1941 |
| 2,335,398 | Downey | Nov. 30, 1943 |
| 2,430,163 | Dever | Nov. 4, 1947 |
| 2,435,310 | Hines | Feb. 3, 1948 |
| 2,636,700 | Yarber et al. | Apr. 28, 1953 |
| 2,651,015 | Meredith | Sept. 1, 1953 |
| 2,663,521 | Yarber | Dec. 22, 1953 |
| 2,753,017 | Curl et al. | July 3, 1956 |
| 2,762,464 | Wilcox | Sept. 11, 1956 |
| 2,788,186 | Wilson | Apr. 9, 1957 |
| 2,799,462 | Steigerwald | July 16, 1957 |
| 2,874,810 | Brown | Feb. 24, 1959 |
| 2,914,359 | Yarber | Nov. 24, 1959 |